H. E. MITCHELL.
TIRE.
APPLICATION FILED FEB. 27, 1914.
1,113,036.
Patented Oct. 6, 1914.
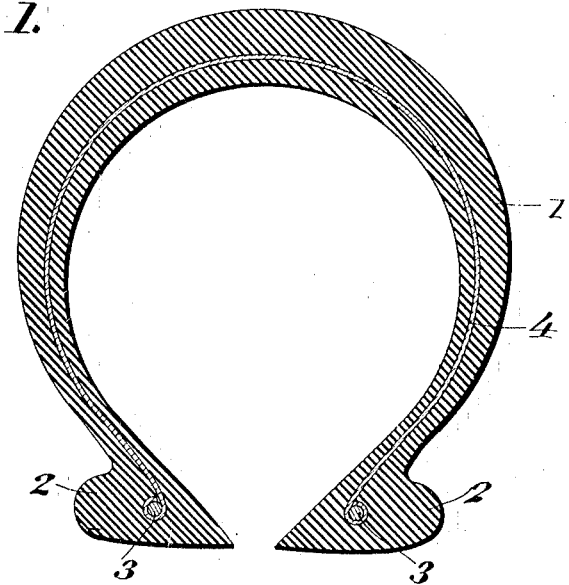
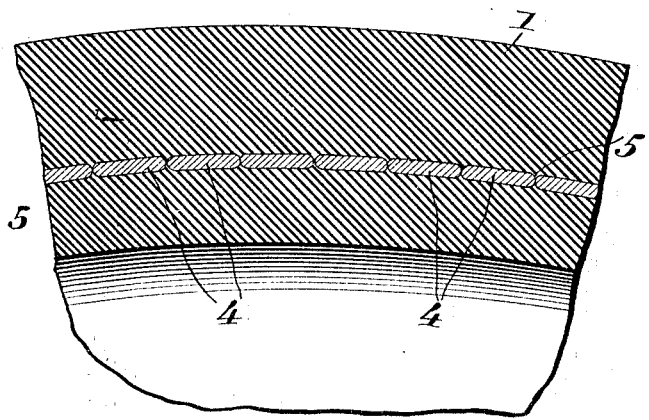

UNITED STATES PATENT OFFICE.

HESEKIAH E. MITCHELL, OF COON RAPIDS, IOWA.

TIRE.

1,113,036. Specification of Letters Patent. Patented Oct. 6, 1914.

Application filed February 27, 1914. Serial No. 821,477.

*To all whom it may concern:*

Be it known that I, HESEKIAH E. MITCHELL, a citizen of the United States, residing at Coon Rapids, in the county of Carroll and State of Iowa, have invented new and useful Improvements in Tires, of which the following is a specification.

This invention relates to tires and especially pneumatic tires, the object of the invention being to provide means whereby the outer case of a pneumatic tire is rendered practically puncture proof thereby materially increasing the life and durability of the tire and avoiding the troubles incident to frequent punctures and blow-outs, the puncture proof feature of the invention adding materially to the strength of the tire casing and thereby resisting serious ruptures and blow-outs.

With the above and other objects in view, the invention consists in the novel construction, combination and arrangement of parts, as will hereinafter be more fully described, illustrated and claimed.

In the accompanying drawings: Figure 1 is a cross section through the outer case of a pneumatic tire embodying the present invention. Fig. 2 is a fragmentary longitudinal section through the same.

Referring to the drawings 1 designates the outer case of a pneumatic tire the same being shown as of the clencher type, being provided with the usual clencher beads 2 although it will be observed as the description proceeds that the invention is applicable to all forms of outer cases including the clencher and straight sided tires.

In carrying out the present invention two endless rings 3 are incorporated in the marginal portions of the outer case 1 as shown in Fig. 2, the said rings preferably consisting of endless lengths of stout wire round in cross section and adapted in addition to the function hereinafter described to assist in tightly binding and holding the outer case on the rim of the wheel (not shown).

The rings 3 are connected by an endless series of arched and transversely extending bands or straps 4 of metal, each of said straps or bands comprising parallel outer and inner surfaces and rounded abutting edges 5. These rounded edges are adapted to ride in contact with each other without serious wear and without cutting the rubber or the combined rubber and canvas of which the outer case 1 is composed. It is preferred to arrange the straps or bands 4 in close relation to or actual contact with each other as illustrated in Fig. 2 so that tacks, nails and like objects cannot force their way between the abutting edges of the members 4 so as to penetrate entirely through the outer case and inner tube.

I do not desire to be limited to any special construction of outer case 1 whether composed wholly of rubber or partly of rubber and partly of textile fabric incorporated in the rubber and vulcanized thereto. The arched strands may either be of soft metal or of spring metal as preferred so as to admit of the necessary resiliency of the outer case in actual road usage.

What I claim is:—

The combination with a pneumatic tire outer case, provided with thickened marginal beads, of endless rings incorporated in said marginal beads, and an endless series of arched bands each terminally looped around said rings and extending throughout the cross sectional area of said outer case in which they are embedded throughout their length, the side edges of said arched bands being rounded and bearing against each other.

In testimony whereof I affix my signature in presence of two witnesses.

HESEKIAH E. MITCHELL.

Witnesses:
C. M. HARRIS,
ROSS MARTIN.